United States Patent
Yokokita et al.

[11] Patent Number: 6,068,715
[45] Date of Patent: May 30, 2000

[54] GLASS FIBER MAT FOR STAMPABLE SHEET, PROCESS FOR THE PRODUCTION OF THE MAT, STAMPABLE SHEET MADE FROM SAID MAT, PROCESS FOR THE PRODUCTION OF THE SHEET, AND EQUIPMENT FOR THE PRODUCTION THEREOF

[75] Inventors: Masahiko Yokokita; Akio Onodera; Yoshinobu Shichiri; Toru Watanabe; Shigehiro Matsuno, all of Gifu, Japan

[73] Assignee: UBE-Nitto Kasei Co., Ltd., Tokyo, Japan

[21] Appl. No.: 08/776,771

[22] PCT Filed: Jun. 5, 1996

[86] PCT No.: PCT/JP96/01507

§ 371 Date: Feb. 7, 1997

§ 102(e) Date: Feb. 7, 1997

[87] PCT Pub. No.: WO96/40477

PCT Pub. Date: Dec. 19, 1996

[30] Foreign Application Priority Data

Jun. 7, 1995 [JP] Japan .................................. 7-140937

[51] Int. Cl.⁷ ...................................................... B27N 3/00
[52] U.S. Cl. .......................... 156/62.2; 156/148; 156/222; 156/296; 156/312; 428/34.5; 428/34.7; 428/74; 428/113; 428/299.4; 428/300.7; 428/340; 428/902; 442/175; 442/180; 442/327; 427/299

[58] Field of Search .................................... 156/62.2, 312, 156/296, 311, 181, 148, 441, 324, 222; 28/107; 264/136, 175; 425/113, 371; 427/299, 389.8; 442/175, 180, 331, 327, 367, 388; 428/300.7, 368, 902, 113, 114, 301.4, 299.4, 34.5, 34.7, 74, 340, 297.4, 76, 219

[56] References Cited

U.S. PATENT DOCUMENTS

| | | | |
|---|---|---|---|
| 4,315,789 | 2/1982 | Tongel | 156/181 |
| 5,565,049 | 10/1996 | Simmons et al. | 156/62.6 |
| 5,681,887 | 10/1997 | Ikeda et al. | 524/494 |

*Primary Examiner*—Deborah Jones
*Assistant Examiner*—Abraham Bahta
*Attorney, Agent, or Firm*—Wenderoth, Lind & Ponack, L.L.P.

[57] ABSTRACT

A glass fiber mat for a stampable sheet includes long fibers and short fibers which will not separate even during forming and which are distributed uniformly to make the features of the respective fibers effective. A production system includes a double belt press type laminator which stacks the glass fiber mat, a thermoplastic resin melt and a film which is taken up and applies heat and pressure for impregnation, and cools while maintaining a pressure condition. A supply supplies the glass fiber mat into the laminator. A pair of pressure shearing rollers are arranged between the supply and an endless belt of the laminator for partially cutting the glass fibers into short fibers. The rollers are made of steel to apply line pressure to the glass fiber mat to shear the continuous fibers to uniformly distribute the short fibers in long fibers.

15 Claims, 5 Drawing Sheets

FIG.4
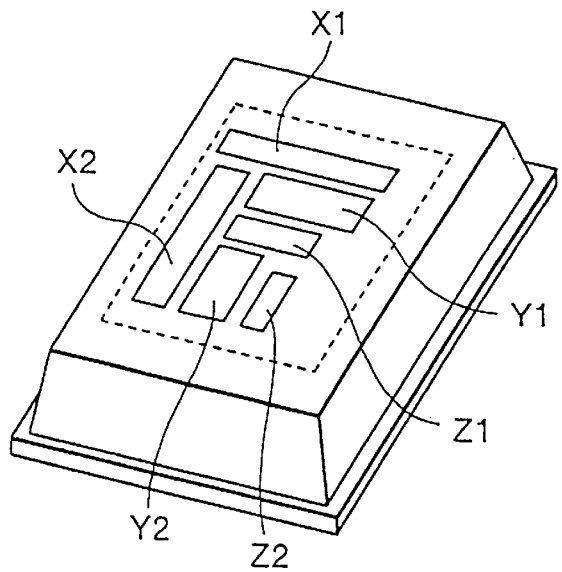
FIG.5(a)
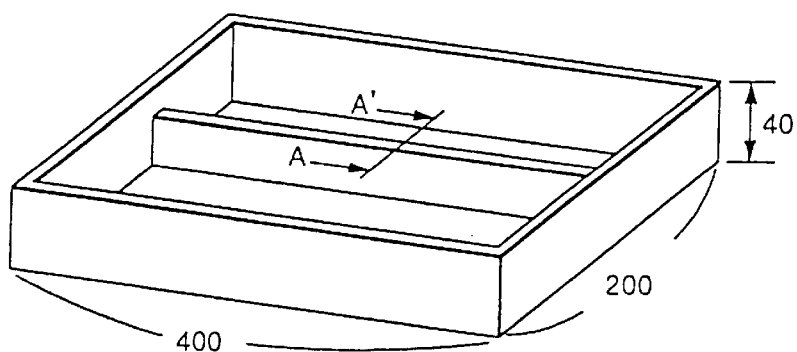
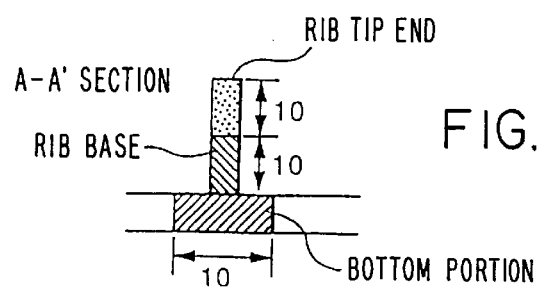
FIG. 5(b)

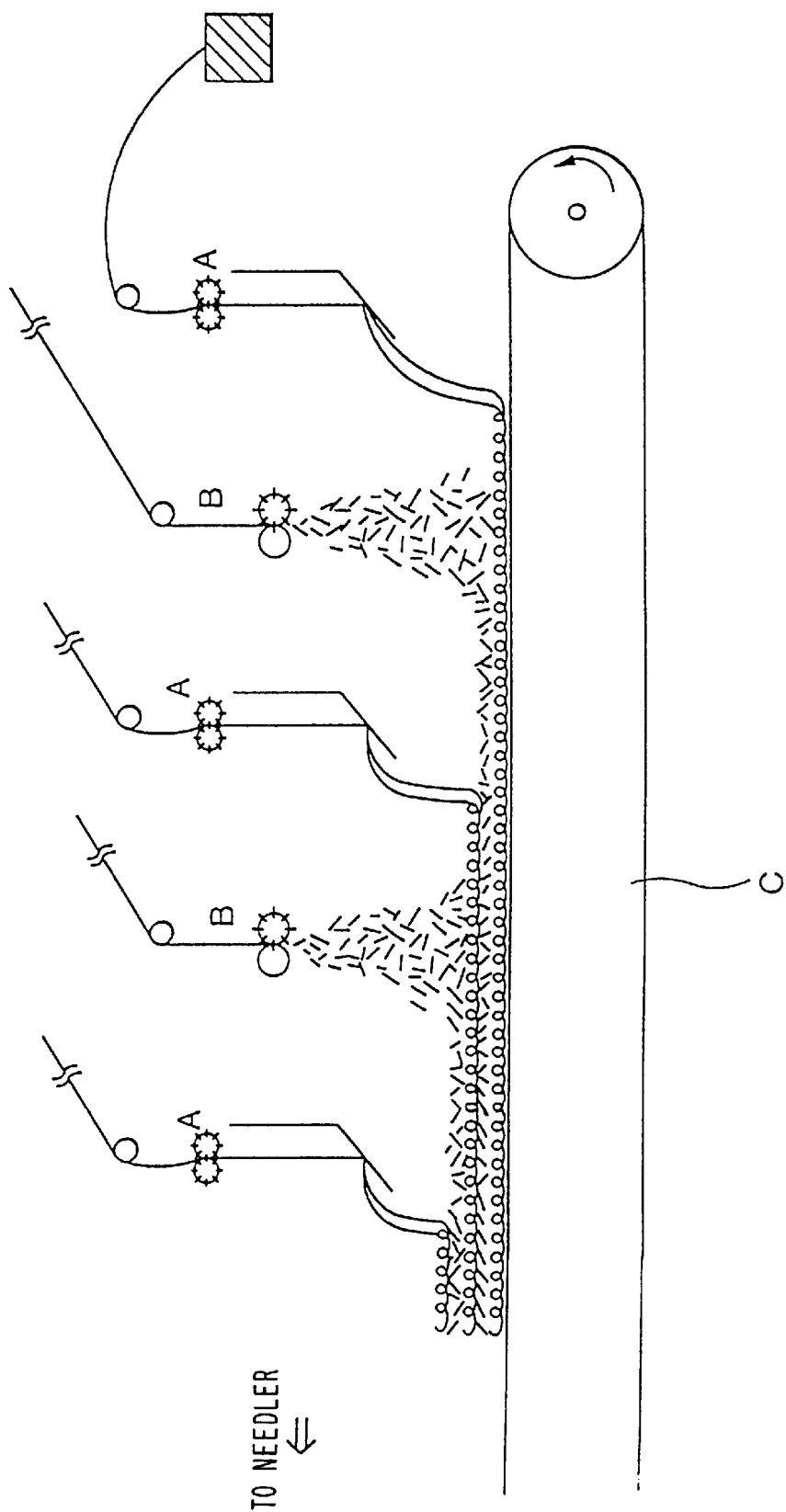

GLASS FIBER MAT FOR STAMPABLE SHEET, PROCESS FOR THE PRODUCTION OF THE MAT, STAMPABLE SHEET MADE FROM SAID MAT, PROCESS FOR THE PRODUCTION OF THE SHEET, AND EQUIPMENT FOR THE PRODUCTION THEREOF

APPLICABLE FIELD OF THE INVENTION

The present invention relates to a glass fiber mat for a stampable sheet, a production process thereof, a stampable sheet employing the glass fiber mat, a production process thereof, and a production system therefor.

BACKGROUND OF THE INVENTION

A stampable sheet is a sheet form article, in which a thermoplastic resin is impregnated in reinforcement fibers. There are various stampable sheets depending upon production processes and forms of reinforcement fibers. As production processes of the stampable sheet, a lamination method and dispersing method have been known.

The lamination method is a method in which a fiber mat first is prepared from reinforcement fibers, the fiber mat and a thermoplastic resin sheet or molten thermoplastic resin sheet are stacked, and then, the thermoplastic resin is impregnated into the fiber mat by applying heat and pressure (U.S. Pat. Nos. 3,644,909, 3,713,962 and 3,850,723).

On the other hand, the dispersing method is a method for producing the stampable sheet in which after mixing and dispersing reinforcement fibers and thermoplastic resin, the mixture is shaped into a sheet form, and heat and pressure are applied to the sheet form mixture. This method is divided into a wet method to perform mixing and dispersing in water (Japanese Examined Patent Publication (Kokoku) No. Heisei 2-48423, Japanese Examined Patent Publication No. Heisei 3-4678 and Japanese Examined Patent Publication No. Heisei 4-40372) and a dry method to perform mixing and dispersing within a special mixer without using water (Japanese Examined Patent Publication No. Heisei 3-55312, Japanese Examined Patent Publication No. Heisei 2-42058 and Japanese Unexamined Patent Publication (Kokai) No. Heisei 4-173311). In the wet method, reinforcement short fibers and thermoplastic resin powder are mixed in water, made into a sheet by a paper machine by adding a flocculating agent or a binder, and water is removed to dry and to form a sheet. A plurality of sheets are stacked as required, and heat and pressure are applied to obtain the stampable sheet. On the other hand, in the dry method, reinforcement fibers and thermo-plastic resin powder are mixed within a special mixing chamber, formed into sheet form on a belt, and heat and pressure are applied to form the stampable sheet.

The stampable sheet formed by lamination method has high impact strength since the reinforcement fibers are continuous fibers. However, it is difficult to cause local orientation due to mechanical entangling of the fibers. On the other hand, since the reinforcement fibers cannot be sufficiently filled into a rib or a boss, the design strength cannot be achieved. Therefore, freedom in designing of products is limited.

On the other hand, the stampable sheet produced by dispersing method has shorter fibers in comparison with the lamination method. This easily causes fluctuations of strength due to local orientation of the reinforcement fibers. Such sheet also has low impact strength. On the other hand, since the reinforcement fibers can be filled even into a rib or boss, designing of the products is easy.

Therefore, there have been several proposals for obtaining the features of short fiber reinforcement in a stampable sheet of long fiber reinforcement typically obtained by the lamination method.

For example, examples of attempts for improvement by impregnating a resin containing short fibers in a long fiber mat have been disclosed in Japanese Unexamined Patent Publication No. Showa 48-80172, Japanese Unexamined Patent Publication No. Showa 54-21476, Japanese Unexamined Patent Publication No. Showa 55-161618, Japanese Unexamined Patent Publication No. Showa 57-100029 and Japanese Examined Patent Publication No. Heisei 4-65854. However, in such methods, as pointed out in Japanese Unexamined Patent Publication No. Showa 64-4320, most of the short fibers are filtered by the long fiber mat to penetrate almost only resin into the mat. Then, most of the short fibers form a layer in the vicinity of the surface of the long fiber mat. When stamp forming is performed with such stampable sheet, the short fibers may occupy most of the proportion of the reinforcement fibers to be filled, in a rib, boss and end portion of a formed product. Conversely, in a charge portion of the original sheet, the long fibers may occupy most of the proportion. As a result, differences of proportions of the long fibers and the short fibers can be caused at various portions of the product. This causes differences in impact strength and fatigue characteristics, or, anisotropy may be caused due to local orientation of the short fibers. Furthermore, distortions also may be caused.

While not directed to a stampable sheet, as a sheet form material of a fiber reinforced, thermoplastic resin, which can be formed by pressure forming, and in which the long fibers and the short fibers are combined, a long fiber mat and a short fiber mat are stacked and thermoplastic resin is impregnated into the stacked mats, as disclosed in Japanese Unexamined Patent Publication No. Showa 58-98241. In this publication, one long fiber mat and short fiber mat are stacked and the thermo-plastic resin in impregnated thereinto. From this, it can be considered that a stampable sheet, in which continuous fibers and the short fibers are uniformly distributed, easily can be obtained by stacking a plurality of thin continuous fiber mats and thin short fiber mats and formed into a mat by needle punching, and impregnating thermoplastic resin into the needle punched mat. However, when this is practiced, as shown in FIG. 7, for example, production units (A) of the continuous fiber mat and production units (B) of the short fiber mat have to be arranged alternately along the transporting direction of a conveyer C. This requires a huge capital investment.

Then, upon needle punching the continuous fiber mat, when punching density is increased or the penetration depth of the needles is made deeper, cutting of the fibers is increased. Thus, a mat in which the short fibers are distributed in the continuous fiber can be obtained. By impregnating the thermo-plastic resin in this mat, a stampable sheet can be obtained.

However, such stampable sheet has the following drawback. Namely, when the punching density is increased, entangling of the fibers can become stronger to make the mat difficult to loosen upon forming. This requires a higher forming pressure. On the other hand, when the penetration depth of the needles is made deeper, the number of fibers oriented in the thickness direction is increased, thus to increase the loft (nominal thickness) of the mat. As a result, upon heating, a blank (hot blank) is expanded significantly to cause a tempera- ture difference between an inner layer thereof and a surface layer thereof. If the heating period is expanded for eliminat- ing such temperature difference, the surface layer can be overheated to degrade appearance. Furthermore, heating aging can be promoted to degrade physical properties.

Therefore, the object of the present invention is to provide a glass fiber mat for a stampable sheet, in which long fibers and short fibers are not separated and are distributed uniformly even in a forming process, and which has the effective characteristics of the respective fibers, a production process thereof, a stampable sheet employing such glass fiber mat, a production process thereof, and a production system therefor.

SUMMARY OF THE INVENTION

As a result of an extensive study to solve the problems set forth above, the inventors have found that the problems can be solved by forming a glass fiber mat for a stampable sheet formed of continuous glass fibers and short glass fibers produced by clamping the glass fibers under pressure to cause partial cutting of the fibers, and thus containing long fibers of a length longer than or equal to 10 mm and short fibers of a length shorter than 10 mm.

In the preferred construction, the glass fiber mat is obtained by clasping a continuous fiber needling mat, in which the fibers of different fiber lengths are entangled each other, and the long fibers having a fiber length greater than or equal to 10 mm and the short fibers having a fiber length less than 10 mm are distributed uniformly. The glass fiber mat may contains 30 to 60 Wt % of glass fibers having fiber the length less than 10 mm, 70 to 40 Wt % of glass fiber having the fiber length greater than or equal to 10 mm, and the glass fibers having the fiber length greater than or equal to 10 mm contains more than or equal to 5% of glass fibers having a fiber length greater than or equal to 50 mm. When a unit weight is 900 g/m$^2$, tensile strength is 0.5 to 3 kgf/200 mm and mat loft is 5 to 10 mm.

A stampable sheet, according to the present invention, is produced by impregnating a thermoplastic resin into the glass fiber mat. Preferably, a fiber content is 40 Wt % and a unit weight is 4.4, kg/M$^2$, a hot blank loft is 6 to 16 mm.

A production process for producing a glass fiber mat to be formed into a fiber reinforced thermoplastic resin stampable sheet by impregnation of a thermoplastic resin, according to the present invention, comprises clasping a glass fiber mat formed with continuous glass fibers or a continuous glass fiber needling mat between a pair of rollers at a predetermined pressure to form long fibers having a fiber length greater than or equal to 10 mm and short fibers having a fiber length less than 10 mm which are formed by partially cutting the glass fiber.

A production process for producing a fiber reinforced thermoplastic stampable sheet by impregnating a thermoplastic resin, according to the present invention, comprises needling a continuous glass fiber mat for entangling fibers, clasping the glass fiber mat formed with continuous glass fibers for partially cutting the fibers, and thereafter impregnating the thermoplastic resin.

A production system of a stampable sheet, according to the present invention, comprises a laminator, fiber mat supply means for supplying a glass fiber mat into the laminator, and a pair of rollers arranged between the laminator and the fiber mat supply means and clasping the fiber mat for partially cutting the glass fibers into longer fibers having fiber length greater than or equal to 10 mm and short fibers having fiber length less than 10 mm.

BRIEF DESCRIPTION OF THE DRAWINGS

FIG. 4 is a perspective view showing a sample for measuring a general mechanical property;

FIG. 5(a) is a perspective view showing a sample for evaluating forming mobility B (flow of GF to a rib), FIG. 5(b) is an enlarged section of the rib;

FIG. 7 is an explanatory illustration showing one example of the conventional production process of a composite mat of continuous fiber and short fiber.

DESCRIPTION OF THE PREFERRED EMBODIMENT

Figure 1:
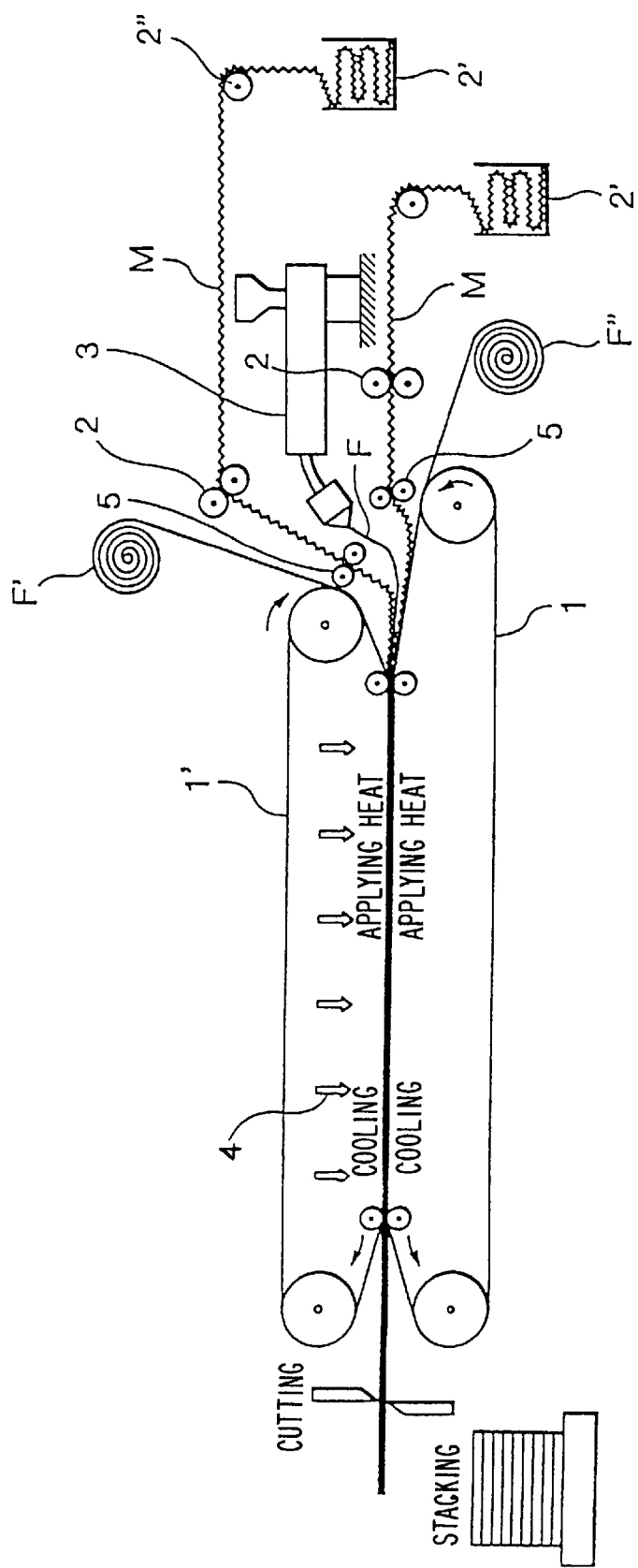
FIG. 1 is an explanatory illustration showing one embodiment of a stampable sheet producing system according to the present invention.

A glass fiber mat, in accordance with the present invention, is formed as a stampable sheet with continuous glass fibers and short glass fibers produced by clasping the glass fibers under pressure for partially causing cutting of the fibers, and thus contains long fibers of a length longer than or equal to 10 mm and short fibers of a length shorter than 10 mm.

Here, it is preferred that the short fibers (fiber length is less than 10 mm) and the long fibers (fiber length is greater than or equal to 10 mm) are distributed uniformly in the mat. While a construction, in which short fiber is arranged on upper and lower surfaces of a mat of the long fiber can be often seen, the short fiber and the long fiber may be separated in a secondary forming operation to cause a local concentration in the length of the fibers in various portions of the formed product. This can be a cause of fluctuation of mechanical properties to make difficult the designing of the products.

It is preferred that the glass fiber having the fiber length greater than or equal to 10 mm is 40 to 70 Wt/% of the mat. In case of the mat having only fibers having a fiber length less than 10 mm, the stampable sheet obtained from such mat has poor impact resistance and easily causes local orientation of the fibers during forming. On the other hand, in case of the glass fiber mat formed with fibers having a fiber length greater than or equal to 10 mm, a number of points of entanglement of the fibers becomes large to require a higher forming pressure for obtaining a secondary product. As a result, the forming speed can be lowered resulting in low productivity and requiring a large scale production facility.

On the other hand, it is further preferred that the glass fibers having fiber lengths greater than or equal to 50 mm is in a range of 5 to 10 Wt % of the weight of the mat. When the content of the glass fibers having a fiber length greater than or equal to 50 mm is less than 5%, the short fibers and the longer fibers may be separated during a secondary forming operation to cause local concentration of the fibers, and orientation of the shorter fibers can be caused. As a result, anisotropy in the physical property of the mat can be caused. Conversely, when the content of the glass fibers having fiber lengths greater than or equal to 50 mm is greater than 10%, mobility in the secondary forming operation tends to be degraded.

On the other hand, in the glass fiber mat, when the unit weight (hereinafter referred to as "Metsuke") is a standard 900 g/m$^2$, it is referred that the tensile strength is 0.5 to 3 kgf/200 mm, and a mat loft or nominal thickness is 5 to 10 mm. Normally, while the tensile strength of the continuous fiber mat obtained by needling is on the order of 20 kg, most of the fiber is continuously entangled. Thus, it is difficult to fill the glass fiber in a small portion of the formed product, such as rib, boss or so forth. Accordingly, in order to obtain sufficient mobility as intended by the present invention, it is required that the tensile strength is less than or equal to 3 kg. Furthermore, when the tensile strength of the mat is less than 0.5 kg, due to lack of binding power of the mat per se, the mat may easily cause pulling apart or so forth upon transporting a hot blank into a mold. Therefore, such a mat is difficult to use.

The glass fiber mat having the properties set forth above easily can be obtained by clasping the needled glass fiber mat. By needling, the continuous fibers becomes entangled to form a mat which can be handled. At this time, by cutting of the fibers, short fibers may be created. However, the proportion of the short fibers thus created is small. Therefore, shearing of the fibers is increased upon needle punching of the continuous fiber mat, by increasing the punching density or by increasing the penetration depth of the needle, and a mat containing a large amount of short fibers thus can be obtained from the continuous fibers.

However, when the punch density is increased, entangling of fibers is strengthened to cause the necessity of a high forming pressure to prevent loosening of the mat in a secondary forming operation. On the other hand, when the penetration depth of the needle is increased, the number of fibers oriented in the thickness direction of the mat is increased to make the mat loft (nominal thickness) greater. As a result, a blank (hot blank) is significantly expanded to cause a temperature difference between the inner layer and the surface layer in the blank. When the heating period is expanded for eliminating such temperature difference, the surface layer becomes overheated to cause degradation of the external appearance of the formed product. Also, thermal aging is promoted to degrade the physical properties.

By clasping the needled glass mat as in the present invention, the entangled portion is selectively compressed and cut, and a wide range of fiber length distribution can be provided for reducing mat loft which can be a problem during heating.

As a method of clasping according to the present invention, it is possible simply to apply pressure by clamping the glass fiber mat between two metal plates. For continuous production, it is desirable to clamp the glass fiber mat with a pair of metal rolls. On the other hand, by providing the metal plates or rolls to be uneven, a mat with partially cut fibers can be obtained.

The hot blank loft of the stampable sheet according to the present invention is preferably 6 to 16 mm, and more preferably 8 to 12 mm. When the hot blank loft is less than 6 mm, the surface of the molten stampable sheet becomes tacky and easily can cause adhesion of the resin on a working glove during transportation of material to thus lower handling ability. On the other hand, when the hot blank loft is greater than or equal to 16 mm, a temperature difference can be caused between the surface layer and the intermediate layer to cause lowering of mobility.

In the glass fiber mat according to the present invention, the standard mat loft, in which the Metsuke is 900 g/m$^2$, is preferably 5 to 10 mm, and more preferable 6 to 8 mm. When the mat loft is less than 5 mm, the resin may be locally concentrated on the surface layer of the stampable sheet blank in the resin impregnation process during lamination, and as a result influence handling due to surface tackiness or so forth during a heated state (hot blank) in a secondary forming operation. Conversely, in case of the mat loft greater than or equal to 10 mm, the hot blank loft can become greater than or equal to 16 mm upon processing of the stampable sheet to cause a temperature difference.

EXAMPLES 1 TO 4, COMPARATIVE EXAMPLES 1 TO 3

Employing glass fiber roving (manufactured by Nitto Boseki K K.) shown in table 1, after shaking off the glass fiber roving without providing directionality, needle punching was effected under the conditions of a punching density of 30 needles/cm$^2$ and a penetration depth of the needles of 14.5 mm to obtain a glass fiber mat with a Metsuke 900 g/cm$^2$. This glass fiber mat was supplied to a stampable sheet producing system shown in FIG. 1 to obtain a stampable sheet of a glass content of 40 Wt % and a Metsuke of 4.4 kg/M$^2$.

The stampable sheet producing system includes a double belt press type laminator 4 which laminates the supplied glass fiber mat M with the thermoplastic resin melt F and thermoplastic resin films F' and F" wound on rolls, impregnates the resin by applying heat and pressure, cools the resin impregnated laminate under pressure to form a sheet, a supply means for supplying the glass fiber mat M to the laminator, and a pair of pressure shearing rollers 5 located between the supply means 2 and endless belts 1, 1' of the laminator 4 for clasping the glass fiber mat to cut a part of the fibers into short fibers. Each roller is made of copper and has a 200 mm$\phi$ diameter, and exerts a line pressure shown in table 1 for pressure shearing the continuous fibers to uniformly distribute the short fibers in the long fibers.

The pressure shearing line pressure of the rollers 5 is set in consideration of the fiber length distribution after processing, mat strength and hot blank loft. This pressure is differentiated depending upon the binder composition or fiber diameter in the roving employed as the glass fiber mat. In order to obtain the glass fiber mat and the stampable sheet according to the present invention, the mat tensile strength and the hot blank loft have to be set within a specific range. For example, in case of the example 1, the pressure preferably 60 to 120 kg/cm, and more preferably 80 to 100 kg/cm.

TABLE 1

| NO. | Name of Roving | Fiber Diameter | Binder | Pressure Shearing Line Pressure | Reinforcement |
|---|---|---|---|---|---|
| Exam. 1 | RS42RA-305 | 23 μm | vinyl acetate | 90 kg/cm | Sheared |
| Comp. 1 | RS42RA-305 | 23 μm | vinyl acetate | 0 kg/cm | Continuous |
| Exam. 2 | RS24QA-305 | 17 μm | acryl | 35 kg/cm | Sheared |
| Comp. 2 | RS24QA-305 | 17 μm | acryl | 10 kg/cm | Sheared |
| Exam. 3 | RS24QA-305 | 17 μm | acryl | 45 kg/cm | Sheared |
| Exam. 4 | RS24QA-305 | 17 μm | acryl | 70 kg/cm | Sheared |
| Comp. 3 | RS24QA-305 | 17 μm | acryl | 90 kg/cm | sheared |
| Comp. 4 | RS24QA-305 | 17 μm | acryl | 0 kg/cm | continuous/chopped |
| Comp. 5 | RS24QA-305 | 23 μm | vinyl acetate | 45 kg/cm | Sheared |
| Comp. 6 | RS24QA-305 | 23 μm | vinyl acetate | 135 kg/cm | Sheared |
| Comp. 7 | RS24QA-305 | 23 μm | vinyl acetate | 0 kg/cm | Continuous |

COMPARATIVE EXAMPLE 4

Employing glass fiber roving (manufactured by Nitto Boseki K K.) shown in table 1, after shaking the glass fiber roving onto the conveyer without providing directionality, needle punching was effected under conditions of a punching density of 30 needles/cm$^2$ and a penetration depth of the needles of 14.5 mm to obtain a glass fiber mat of a Metsuke of 450 g/cm$^2$. This glass fiber mat was supplied to a stampable sheet producing system shown in FIG. 1 to obtain a stampable sheet without performing pressure shearing. At this time, for polypropylene to be used as the thermoplastic resin melt F, 33 Wt % of glass chopped strand was added. The polypropylene melt with glass chopped strand was supplied together with films F' and F" of only polypropylene wound on rolls (Metsuke of 45.0 g/m$^2$) to obtain the stampable sheet reinforced by both the continuous fibers and the short fibers equal to 40 Wt % of the glass content (continuous fiber: glass chopped strand=50:50), a Metsuke of 4.4 kg/m$^2$.

COMPARATIVE EXAMPLES 5, 6, 7

Employing glass fiber roving (manufactured by Nitto Boseki K K.) shown in table 1, after shaking the glass fiber roving onto the conveyer without providing directionality, needle punching was effected under the conditions of a punching density of 30 needles/cm$^2$ (40 needles/cm$^2$ in case of comparative example 7) and a penetration depth of the needles of 14.5 mm to obtain glass fiber mat of a Metsuke of 900 g/cm$^2$. This glass fiber mat was supplied to a stampable sheet producing system shown in FIG. 1 to obtain a stampable sheet with pressure shearing at 0 kg/cm, 45 kg/cm and 135 kg/cm.

EVALUATION METHOD

Properties of the foregoing glass mats for stampable sheets produced under the foregoing conditions are evaluated in the following evaluation method. The results of such evaluation are shown in table 2.

TABLE 2

|  |  | Ex. 1 | Comp. 1 | Comp. 5 | Comp. 6 | Comp. 7 |
|---|---|---|---|---|---|---|
| Needle Punch Condition (needles/cm$^2$) | | 30 | 30 | 30 | 30 | 40 |
| Pressure Shearing Condition (kg/cm) | | 90 | NO | 45 | 135 | NO |
| Fiber Length Distribution (Wt %) | less than 10 mm | 51 | 4 | 18 | 63 | 31 |
| | 10 to less than 50 mm | 42 | 3 | 31 | 37 | 59 |
| | 50 mm or more | 7 | 93 | 51 | 0 | 10 |
| | Total | 100 | 100 | 100 | 100 | 100 |
| Mat Loft (mm) | | 7 | 10 | 9 | 4 | 13 |
| Mat Strength (kg/200 cm width) | | 0.8 | 24.0 | 3.6 | 0.4 | 6.2 |
| Hot Blank Loft (mm) | | 10 | 16 | 12 | 6 | 24 |

① Mat Strength

From an arbitrary position of the clasped glass fiber mat, 6 test pieces 200 mm in width and 250 mm in length were cut. Employing a universal testing machine, maximum tensile strength was obtained by applying tension at testing speed of 20 mm/min.

② Fiber Length

From the clasped glass fiber mat, fibers were carefully drawn out by pincette and the lengths were read from a scale. The fiber lengths were measured for 1000 fibers per one test piece.

③ Hot Blank Loft

Blanks of 125 mm×200 mm were heated for about 6 minutes until the surface temperatures became 210±10° C. by a heating furnace set at 320° C. The heated blank (hot blank) was quickly put on a machine platen. Also, in order to prevent waving in the hot blank, an iron plate of 125 mm×200 mm (1.6 mm in thickness and 310 g in weight) was added. After cooling for 1 hour, a weight of 5 kg was further added. Then, the thicknesses at four corners were measured to obtain an average thereof as the hot blank loft.

④ Minimum Forming Pressure (How Small Pressure is Required for Forming)

Figure 2:
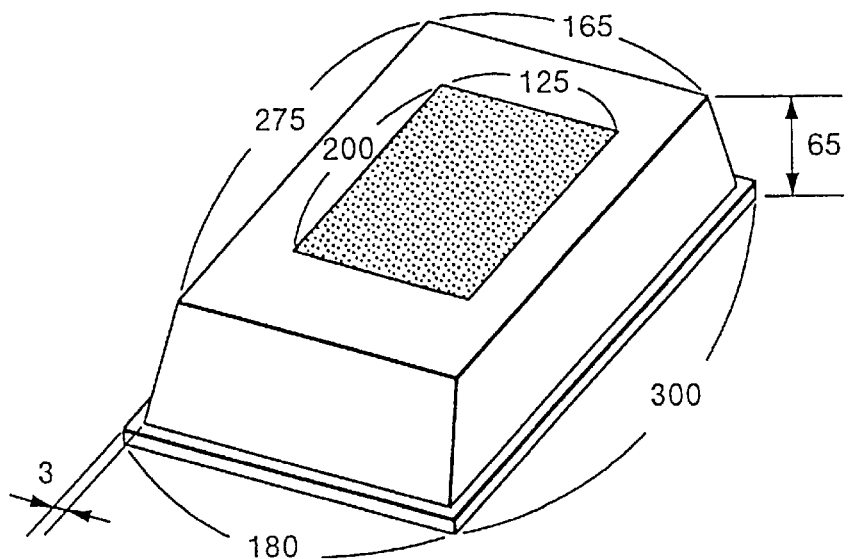
FIG. 2 is a perspective view showing a sample for deriving a minimum forming pressure.
Figure 3:
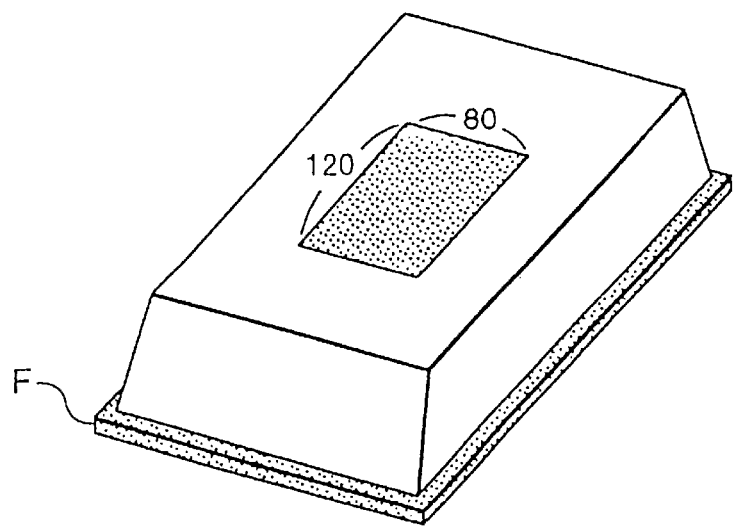
FIG. 3 is a perspective view showing a sample for evaluating forming mobility A (GC ratio)

As an indicia of mobility in forming, three boxes shown in FIG. 2 were formed. Pressure in tons, at which two of the three boxes could be formed without wane, was obtained per unit of 5 tons.

Blank Dimension: 125 mm×200 mm×3 pieces (330±5 g)

Heating Temperature: 210±10° C.

Press Speed: 12 mm/sec.

Mold Temperature: 40° C.

Pressure Holding period: 15 sec.

⑤ Mobility in Forming A (glass fiber content ratio between charge portion and end portion (hereinafter abbreviated as "GC ratio").

The formed product shown in FIG. 2 was formed at a pressure of 100 tons. Then, GC at the bottom portion and the end portion of the formed product as shown as the hatched portion were measured.

$$A = (\text{end portion GC/bottom portion GC}) \times 100[\%]$$

⑥ Mechanical Property

Five formed products shown in FIG. 4 have a bending strength (ASTM D-790, kgf/mm$^2$) and a tensile strength (ASTM D-638, kgf/mm$^2$) at a pressure of 100 tons. From the bottom portions, test pieces are cut as shown in FIG. 4 (10 pieces on average) and measurement was performed with respect thereto.

⑦ Mobility in Forming B (mobility of glass fiber into a rib)

The formed products shown in FIGS. 5(a) and 5(b) are formed under the following conditions and then mobility of the glass fibers in a center rib was evaluated.

Blank Dimension: 143 mm×333 mm×2 pieces (420±6 g)

Rib Thickness: 2 mm

Rib Height: 20 mm

Heating Temperature: 210±10° C.

Press Speed: 16 mm/sec.

Mold Temperature: 50° C.

Pressure Holding Period: 30 sec.

Forming Pressure: 180 tons $$B = (\text{rib tip end GC/bottom portion GC}) \times 100[\%]$$

⑧ Anisotropy (It is not desirable to cause strong anisotropy due to orientation of GF at the flowing portion)

Figure 6:
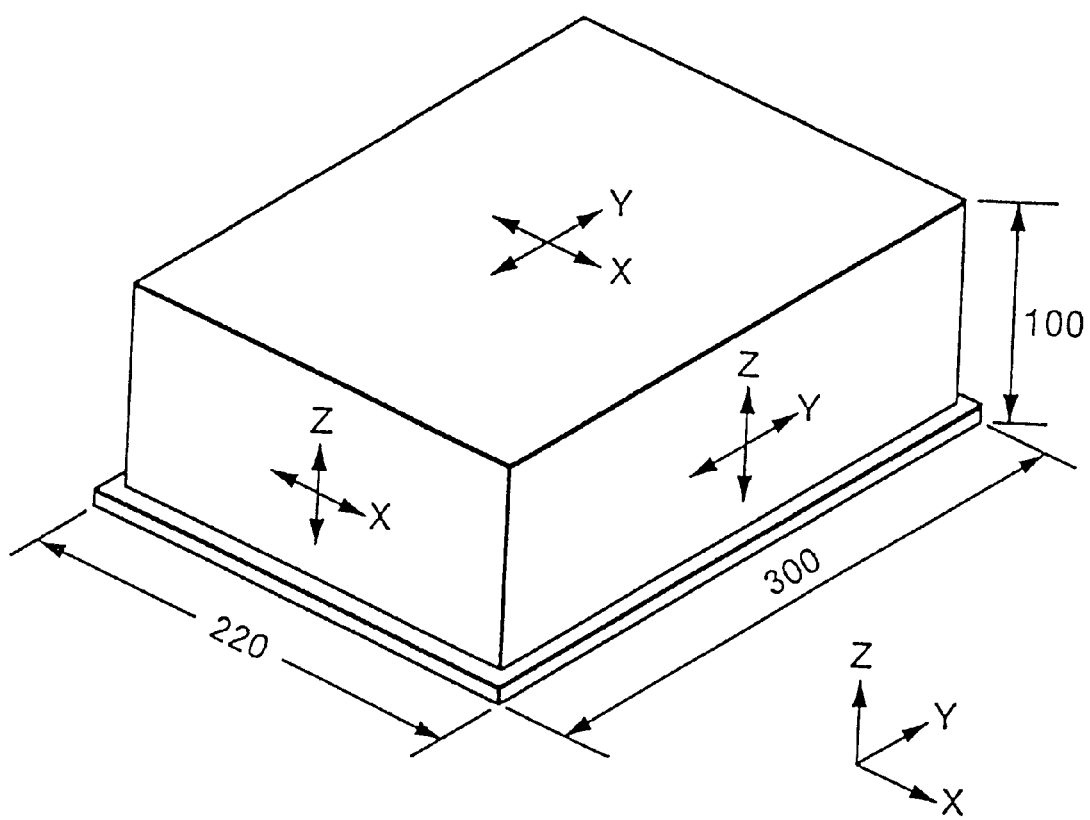
FIG. 6 is a perspective view showing a sample for evaluation of anisotropy.

The formed product shown in FIG. 6 was formed under the following conditions. Then, bending properties at the bottom portion, the longer side portion and the shorter side portion were evaluated by measuring bending strengths in two orthogonal directions and expressing the resulting ratios by %.

Blank Dimension: 143 mm×215 mm×4 pieces (541±8 g)

Heating Temperature: 210±10° C.

Press Speed: 16 rmn/sec.

Mold Temperature: 50° C.

Pressure Holding Period: 30 sec.

Forming Pressure: 180 tons

Next, by impregnating polypropylene resin in this mat, a stampable sheet was prepared. Properties of the obtained stampable sheet were evaluated by the foregoing evaluation methods. The results of such evaluations are shown in table 3.

TABLE 3

|  | | EX. 1 | COM. 1 | EX. 2 | COM. 2 | EX. 3 | EX. 4 | COM. 3 | COM. 4 | COM. 5 | COM. 6 | COM. 7 |
|---|---|---|---|---|---|---|---|---|---|---|---|---|
| Hot Blank Loft | | 10 | 16 | 13 | 17 | 10 | 8 | 8 | 5 | 12 | 6 | 24 |
| Tensile Strength | | 8.0 | 8.7 | 6.8 | 8.0 | 7.3 | 6.8 | 5.0 | 4.7 | 8.0 | 6.0 | 5.8 |
| Bending Strength | | 14.6 | 16.8 | 14.2 | 16.1 | 14.9 | 12.7 | 11.7 | 9.9 | 15.1 | 12.5 | 13.7 |
| Minimum Forming Pressure | | 40 | 55 | 30 | 55 | 35 | 25 | 25 | 25 | 45 | 25 | 60 |
| Forming Mobility A | | 96 | 75 | 97 | 80 | 92 | 104 | 103 | 99 | 91 | 100 | 98 |
| Forming Mobility B | | 60 | 6 | 68 | 20 | 74 | 85 | 90 | 87 | 34 | 86 | 67 |
| Anisotropy | Bottom (y/x) | 109 | 96 | 109 | 101 | 103 | 105 | 106 | 65 | — | — | — |
| | Longer Side (y/z) | 98 | 111 | 100 | 116 | 102 | 98 | 109 | 116 | — | — | — |
| | Shorter Side (x/z) | 99 | 105 | 98 | 103 | 99 | 100 | 102 | 153 | — | — | — |

As will be clear from table 3, the stampable sheet employing the pressured and sheared mat can lower the minimum forming pressure while minimizing lowering of the mechanical strength. Since the glass fibers can flow even into the tip end of the rib or the end portion of the formed product, the strength will not be lowered locally, and significant anisotropy will not be caused. Furthermore, distortion to be caused on the formed product is small. Therefore, freedom in designing of products can be increased.

It should be noted the foregoing embodiments exemplify the preferred range of the tensile strength and the mat loft in the case where the Metsuke of the glass mat is 900 g/m$^2$. However, even if the Metsuke is less than or more than 900 g/m$^2$, such situations are encompassed within the technical scope of the present invention as long as the reduced values of the tensile strength and the mat loft for a Metsuke of 900 g/m$^2$ fall within the foregoing ranges.

As set forth above, in the glass fiber mat for the stampable sheet according to the present invention, the continuous glass fibers, and long fibers having the fibers length greater than or equal to 10 mm and short fibers having the fiber length less than 10 mm which are formed by partially cutting the continuous glass fiber by clasping, are contained uniformly within the mat. Therefore, the may will not expand significantly even upon heating so that a temperature difference between the surface layer and the inner layer will not be caused. Also, the obtained formed product has high dimensional stability and small fluctuation of strength and anisotropy so that the stampable sheet has the advantages of reinforcement by the long fibers and reinforcement by the short fibers.

In the production process of the glass mat according to the method of the present invention, since the long fibers having the fiber length greater than or equal to 10 mm and the short fibers having the fiber length less than 10 mm are formed by partially cutting the glass fibers by clasping the glass fiber mat which is formed with continuous glass fibers, at a predetermined pressure, the glass fiber mat suitable for producing superior stampable sheets can be produced while the production method is simple.

The production system according to the present invention can produce the glass fiber mat, from which the superior stampable mat can be obtained, with simple construction, in which only a pair of rollers are provided between the continuous fiber mat supply means and the laminator.

What is claimed is:

1. A process for producing a glass fiber mat to be used to form a fiber-reinforced thermoplastic resin stampable sheet by impregnation of said glass fiber mat with said thermoplastic resin, said process comprising:

clasping a plurality of continuous glass fibers between a pair of rollers at a predetermined pressure, to thereby partially cut said continuous fibers to form a plurality of long fibers having a fiber length greater than or equal to 10 mm and a plurality of short fibers having a fiber length of less than 10 mm.

2. A process as claimed in claim 1, comprising providing said short fibers to be from 30 to 60 Wt % of a total of said short fibers and said long fibers in said glass fiber mat, said long fibers to be from 70 to 40 Wt % of said total, and no more than 5 % of said long fibers to have a fiber length greater than or equal to 50 mm.

3. A process as claimed in claim 1, comprising providing said glass fiber mat to have a unit weight of 900 g/m$^2$, a tensile strength of 0.5 to 3 kgf/200 mm, and a nominal thickness of 5 to 10 mm.

4. A process for producing a glass fiber mat to be used to form a fiber-reinforced thermoplastic resin stampable sheet by impregnation of said glass fiber mat with said thermoplastic resin, said process comprising:

needling a mat formed of a plurality of continuous glass fibers to thereby entangle said continuous fibers; clasping the thus needled mat of continuous fibers between a pair of rollers at a predetermined pressure, to thereby partially cut said continuous fibers to form a plurality of long fibers having a fiber length greater than or equal to 10 mm and a plurality of short fibers having a fiber length of less than 10 mm.

5. A process as claimed in claim 4, comprising providing said short fibers to be from 30 to 60 Wt % of a total of said short fibers and said long fibers in said glass fiber mat, said long fibers to be from 70 to 40 Wt % of said total, and no more than 5% of said long fibers to have a fiber length greater than or equal to 50 mm.

6. A process as claimed in claim 4, comprising providing said glass fiber mat to have a unit weight of 900 g/m$^2$, a tensile strength of 0.5 to 3 kgf/200 mm, and a nominal thickness of 5 to 10 mm.

7. A process for producing a fiber-reinforced thermoplastic resin stampable sheet, said process comprising:

forming a glass fiber mat by clasping a plurality of continuous glass fibers between a pair of rollers at a predetermined pressure, to thereby partially cut said continuous fibers to form a plurality of long fibers having a fiber length greater than or equal to 10 mm and a plurality of short fibers having a fiber length of less than 10 mm; and impregnating said glass fiber mat with said thermoplastic resin.

8. A process as claimed in claim 7, comprising providing said short fibers to be from 30 to 60 Wt % of a total of said short fibers and said long fibers in said glass fiber mat, said long fibers to be from 70 to 40 Wt % of said total, and no more than 5% of said long fibers to have a fiber length greater than or equal to 50 mm.

9. A process as claimed in claim 7, comprising providing said glass fiber mat to have a unit weight of 900 g/m$^2$, a tensile strength of 0.5 to 3 kgf/200 mm, and a nominal thickness of 5 to 10 mm.

10. A process as claimed in claim 7, wherein said sheet has a glass fiber content of 40 Wt %, a unit weight of 4.4 kg/M$^2$, and a nominal thickness of 6 to 16 mm upon heating.

11. A process for producing a fiber-reinforced thermoplastic resin stampable sheet, said process comprising:

needling a mat formed of a plurality of continuous glass fibers to thereby entangle said continuous fibers;

clasping the thus needled mat of continuous glass fibers between a pair of rollers at a predetermined pressure, to thereby partially cut said continuous fibers to form a glass fiber mat having plurality of long fibers having a fiber length greater than or equal to 10 mm and a plurality of short fibers having a fiber length of less than 10 mm; and impregnating said glass fiber mat with said thermoplastic resin.

12. A process as claimed in claim 11, comprising providing said short fibers to be from 30 to 60 Wt % of a total of said short fibers and said long fibers in said glass fiber mat, said long fibers to be from 70 to 40 Wt % of said total, and no more than 5% of said long fibers to have a fiber length greater than or equal to 50 mm.

13. A process as claimed in claim 11, comprising providing said glass fiber mat to have a unit weight of 900 g/m$^2$, a tensile strength of 0.5 to 3 kgf/200 mm, and a nominal thickness of 5 to 10 mm.

14. A process as claimed in claim 11, wherein said sheet has a glass fiber content of 40 Wt %, a unit weight of 4.4 kg/M$^2$, and a nominal thickness of 6 to 16 mm upon heating.

15. A system for producing a fiber-reinforced thermoplastic stampable sheet, said system comprising:

a laminator;

a fiber mat supply to supply a fiber mat of continuous glass fibers toward said laminator; and a pair of rollers located between said supply and said laminator to clasp the fiber mat at a predetermined pressure, and to thereby partially cut the continuous fibers to form a glass fiber mat having plurality of long fibers having a fiber length greater than or equal to 10 mm and a plurality of short fibers having a fiber length of less than 10 mm;

whereafter the thus formed glass fiber mat is impregnated with thermoplastic resin at said laminator to thereby provide the stampable sheet.

* * * * *